United States Patent
Koteich

(10) Patent No.: US 11,211,886 B2
(45) Date of Patent: Dec. 28, 2021

(54) METHOD FOR CONTROLLING A SYNCHRONOUS ELECTRICAL MACHINE

(71) Applicant: Nissan Motor Co., Ltd., Kanagawa (JP)

(72) Inventor: Mohamad Koteich, Bures sur Yvette (FR)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 16/764,456

(22) PCT Filed: Nov. 6, 2018

(86) PCT No.: PCT/EP2018/080336
§ 371 (c)(1),
(2) Date: May 15, 2020

(87) PCT Pub. No.: WO2019/096630
PCT Pub. Date: May 23, 2019

(65) Prior Publication Data
US 2020/0366226 A1    Nov. 19, 2020

(30) Foreign Application Priority Data
Nov. 16, 2017 (FR) ..................... 1760768

(51) Int. Cl.
*H02P 21/13* (2006.01)
*H02P 21/22* (2016.01)

(52) U.S. Cl.
CPC .............. *H02P 21/13* (2013.01); *H02P 21/22* (2016.02)

(58) Field of Classification Search
CPC .......... H02P 21/06; H02P 21/13; H02P 21/22; H02P 27/04; H02P 6/10; B60W 10/06
See application file for complete search history.

(56) References Cited

U.S. PATENT DOCUMENTS

| | | | |
|---|---|---|---|
| 2003/0001536 A1* | 1/2003 | Kitajima | H02P 21/06 318/629 |
| 2007/0222409 A1* | 9/2007 | Kariatsumari | H02P 21/06 318/807 |

(Continued)

FOREIGN PATENT DOCUMENTS

| | | |
|---|---|---|
| EP | 1276225 A2 | 1/2003 |
| EP | 1843462 A1 | 10/2007 |

(Continued)

*Primary Examiner* — Said Bouziane
(74) *Attorney, Agent, or Firm* — Osha Bergman Watanabe & Burton LLP

(57) ABSTRACT

The disclosure relates to a method for controlling a synchronous three-phase electrical machine having a stator and a rotor. The method may include measuring currents of the first and second phases of the stator. The method may include measuring an angular position of the rotor. The method may include calculating the currents measured in a rotor reference frame. The method may include measuring the rotor current. The method may include calculating an automatic control error. The method may include calculating control voltages for the electrical machine. The method may further include applying the control voltages to said electrical machine. According to the disclosed method, the control voltages are calculated in the rotor reference frame in a recursive manner and as a function of a command update period value, a DC voltage value, and the angular electrical speed of the rotor.

6 Claims, 5 Drawing Sheets

(56) References Cited

U.S. PATENT DOCUMENTS

| | | | | |
|---|---|---|---|---|
| 2011/0169436 A1* | 7/2011 | Takahashi | ............... | H02P 23/14 |
| | | | | 318/400.3 |
| 2016/0233807 A1* | 8/2016 | Rogg | ...................... | H02P 21/14 |
| 2018/0309400 A1* | 10/2018 | Kitamura | ............... | G03G 15/50 |
| 2019/0115859 A1* | 4/2019 | Ishino | .................... | H02P 6/185 |

FOREIGN PATENT DOCUMENTS

| | | |
|---|---|---|
| EP | 1906523 A1 | 4/2008 |
| FR | 3012270 B1 | 4/2017 |
| JP | 200318899 A | 1/2003 |
| JP | 2007259603 A | 10/2007 |
| JP | 4709218 B2 | 6/2011 |
| JP | 2012105403 A | 5/2012 |

\* cited by examiner

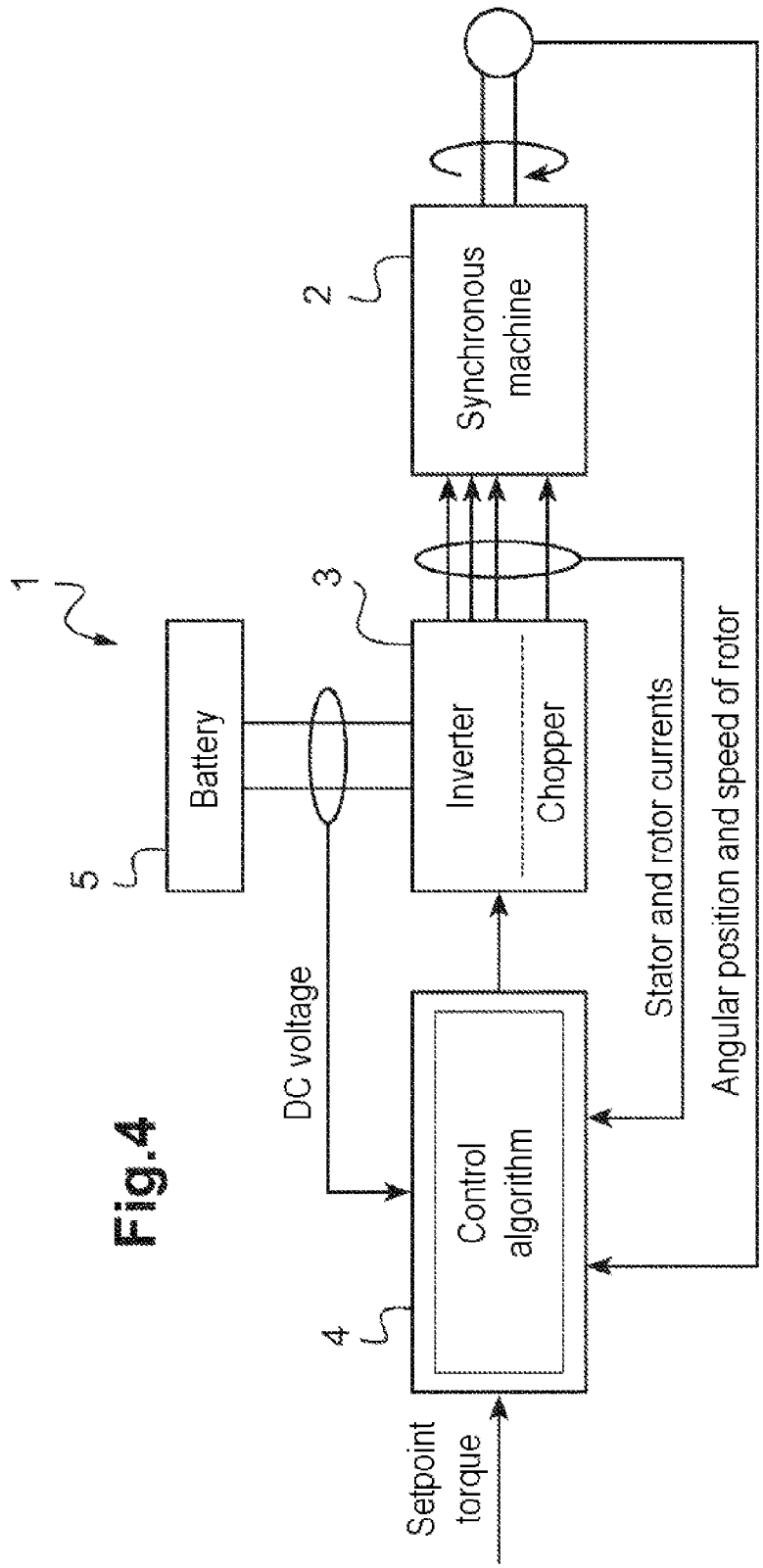

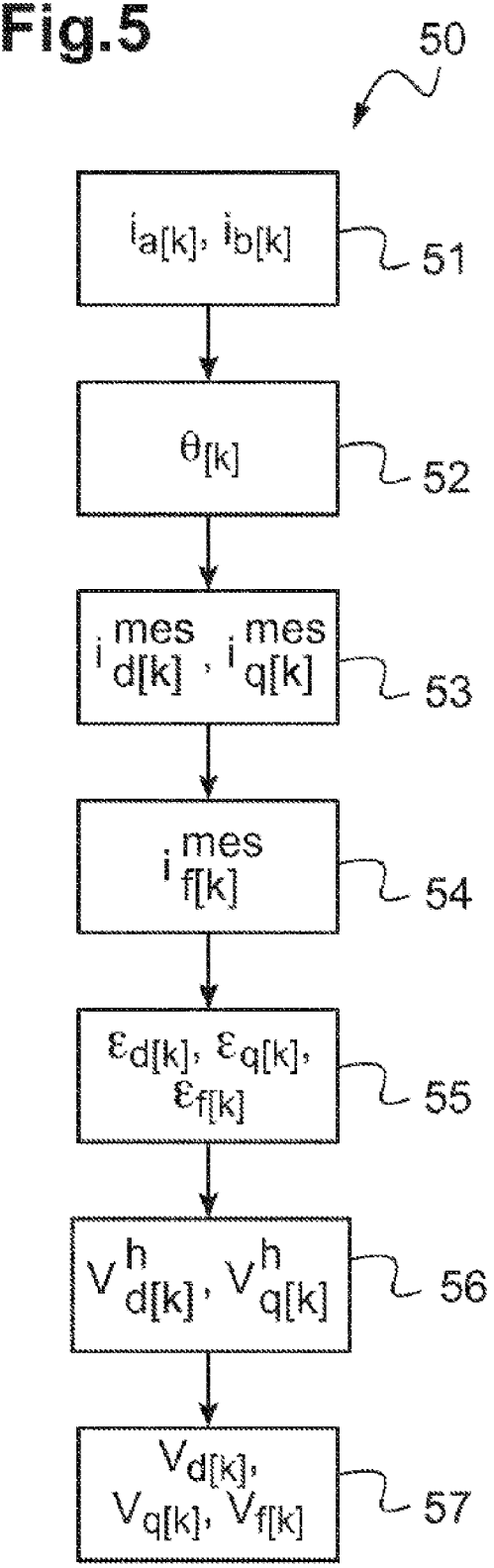

METHOD FOR CONTROLLING A SYNCHRONOUS ELECTRICAL MACHINE

The invention relates to the field of the control of electrical machines.

More specifically, the invention relates to a method for controlling a synchronous electrical machine.

Synchronous electrical machines are well-known in the automobile sector, and in a wide variety of other industrial applications, including the renewable energy sector, rail transport, etc.

A synchronous electrical machine comprises a fixed part, described as a stator, and a moveable part, described as a rotor. The stator comprises three coils, which are mutually offset by 120° and supplied with an alternating current.

The rotor may comprise either a coil which is supplied with a direct current, in the case of wound rotor synchronous machines (known by the abbreviation WRSM), or permanent magnets (in the case of permanent magnet synchronous machines or PMSM), which are driven in rotation by the electromagnetic field which is generated by the stator windings.

The electromagnetic torque delivered by the electrical machine results from the amplitude and orientation of currents in relation to the axis of the rotor.

Accordingly, a setpoint torque can be expressed in terms of setpoint currents (or voltages) in a reference frame associated with the rotor, also described as a rotor reference frame.

Numerous methods for controlling synchronous machines are known from the prior art, including the method described in document FR3012270, filed by the applicant.

However, these methods from the prior art cannot generally be employed for both a WRSM and a PMSM.

Moreover, known methods do not permit the simultaneous combination of the elimination of static error, good performance under transient conditions and the effective compensation of the effects of a back electromotive force, whilst adapting to conditions of voltage saturation and compensating the harmonic components of currents.

Accordingly, there is a requirement for a control method for a synchronous electrical machine which is relatively simply adaptable to a WRSM and a PMSM, whilst resolving the above-mentioned issues.

A method is proposed for controlling a synchronous three-phase electrical machine comprising a stator and a rotor, said method comprising:
measuring currents of the first and second phases of said stator;
measuring the angular position of the rotor;
calculating said currents measured in a rotor reference frame;
calculating an automatic control error;
calculating control voltages for the electrical machine; and
applying said control voltages to said electrical machine.

Said calculation of control voltages is executed in said rotor reference frame, in a recursive manner and as a function of a period value for the updating of control, a value for the DC voltage and the electrical angular speed of the rotor. It is thus possible to achieve a simple control method for an electrical machine, which is adaptable to any type of synchronous machine, and which resolves the above-mentioned problems associated with the prior art.

Advantageously, and not by way of limitation, said measured currents are calculated in the rotor reference frame by means of a Park transformation. Accordingly, it is possible to transform currents measured in a rotor reference frame in a rapid and reliable manner.

Advantageously, and not by way of limitation, the method comprises a step for the measurement of the rotor current; and the calculation of control voltages incorporates the calculation of a voltage to be applied to the wound rotor. Accordingly, the method can be simply adapted to function on a wound rotor machine.

Advantageously, and not by way of limitation, the method comprises a step for the recursive calculation of compensating voltages for current harmonics. It is thus possible to compensate current harmonics in a simple manner, in addition to all the above-mentioned advantages.

Advantageously, and not by way of limitation, said calculation step for control voltages comprises an initialization at 0 for the purposes of recursion. Accordingly, the initialization of calculation steps for control voltages is relatively simple.

The invention further relates to a control device of a synchronous three-phase electrical machine comprising a stator and a rotor, said device comprising:
a component for measuring currents of the first and second phases of said stator;
a component for measuring an angular position of the rotor;
a component for measuring the rotor current;
means for calculating said currents measured in a rotor reference frame;
means for calculating an automatic control error;
means for calculating control voltages for the electrical machine; and
means for applying said control voltages to said electrical machine.

The means for calculating control voltages are appropriate for the execution of said calculation in said rotor reference frame, in a recursive manner and as a function of the value of a period value for the updating of control, a value for the DC voltage and the electrical angular speed of the rotor.

The invention further relates to an electrical system comprising a synchronous electrical machine, having a stator and a wound rotor or a permanent magnet rotor, an electrical accumulator battery for the supply of said electrical machine, a three-phase inverter which is capable of transforming the DC voltage of the electrical accumulator battery into three-phase control voltages for controlling the synchronous electrical machine, and a control device of the type described above.

The invention further relates to a motor vehicle comprising an electrical system of the type described above.

Further particular features and advantages of the invention proceed from the following description of a particular form of embodiment of the invention, which is provided by way of indication and not by way of limitation, with reference to the attached drawings, in which:

FIG. 4 shows a circuit layout of an electrical system according to the first form of embodiment of the invention;

FIG. 5 shows a diagram of steps in the method according to the first form of embodiment of the invention.

With reference to FIG. 4, an electrical system comprises a synchronous three-phase electrical machine 2, a three-phase inverter 3 receiving stator control voltages to be applied to the stator, and a direct current—direct current (DC-DC) converter, also described as a chopper, which is capable of receiving a rotor control voltage to be applied to the rotor.

By way of an input, the three-phase inverter 3 receives a DC voltage $V_{DC}$ from an electrical accumulator battery 5, and is controlled by a control device 4 for the deployment of a method for controlling the electrical machine.

Figure 1:
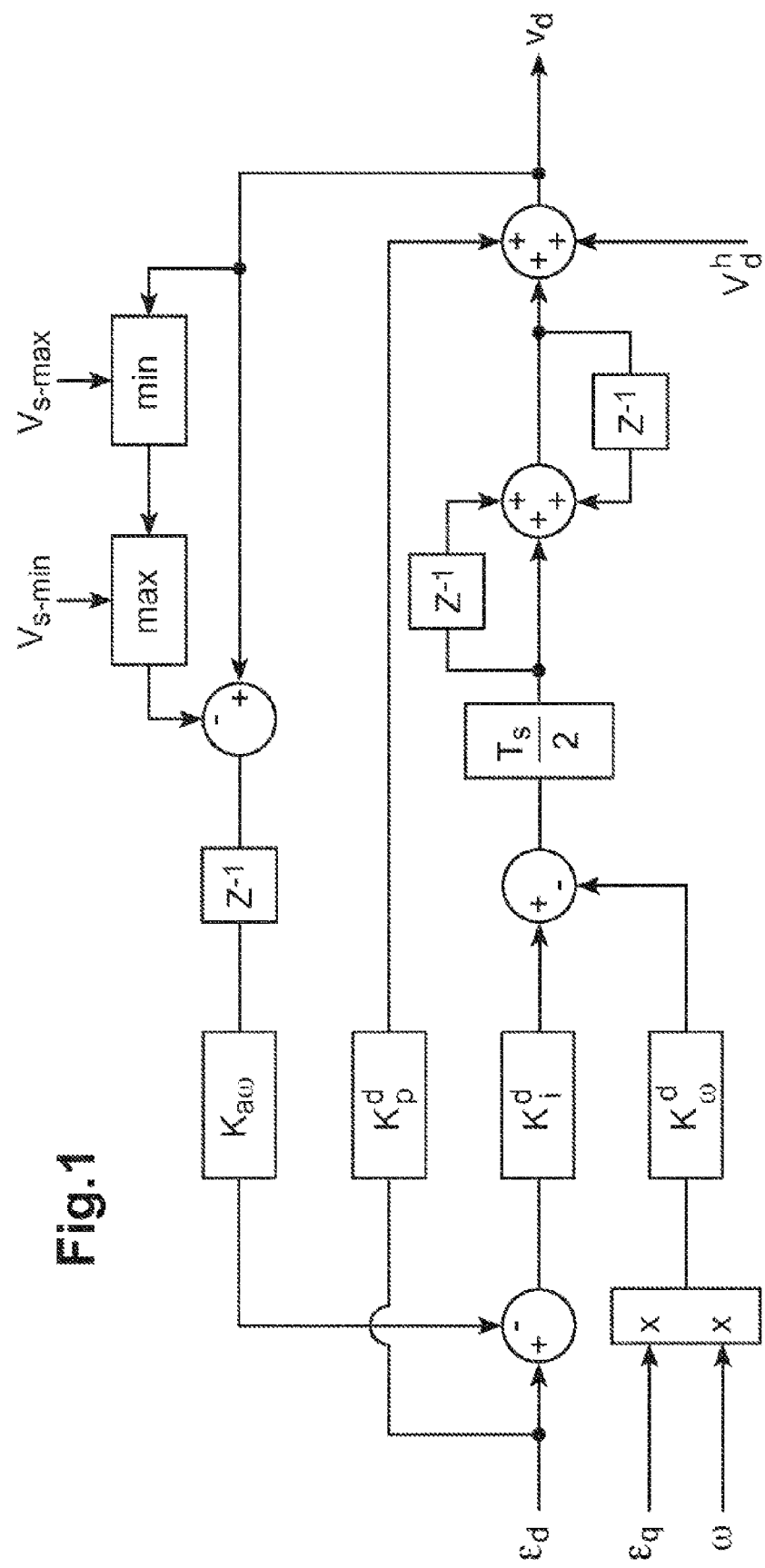
FIGS. 1 and 2 show a schematic representation of steps for calculating control voltages in the method according to a first and second form of embodiment of the invention, for a synchronous electrical machine with a permanent magnet rotor.
Figure 2:
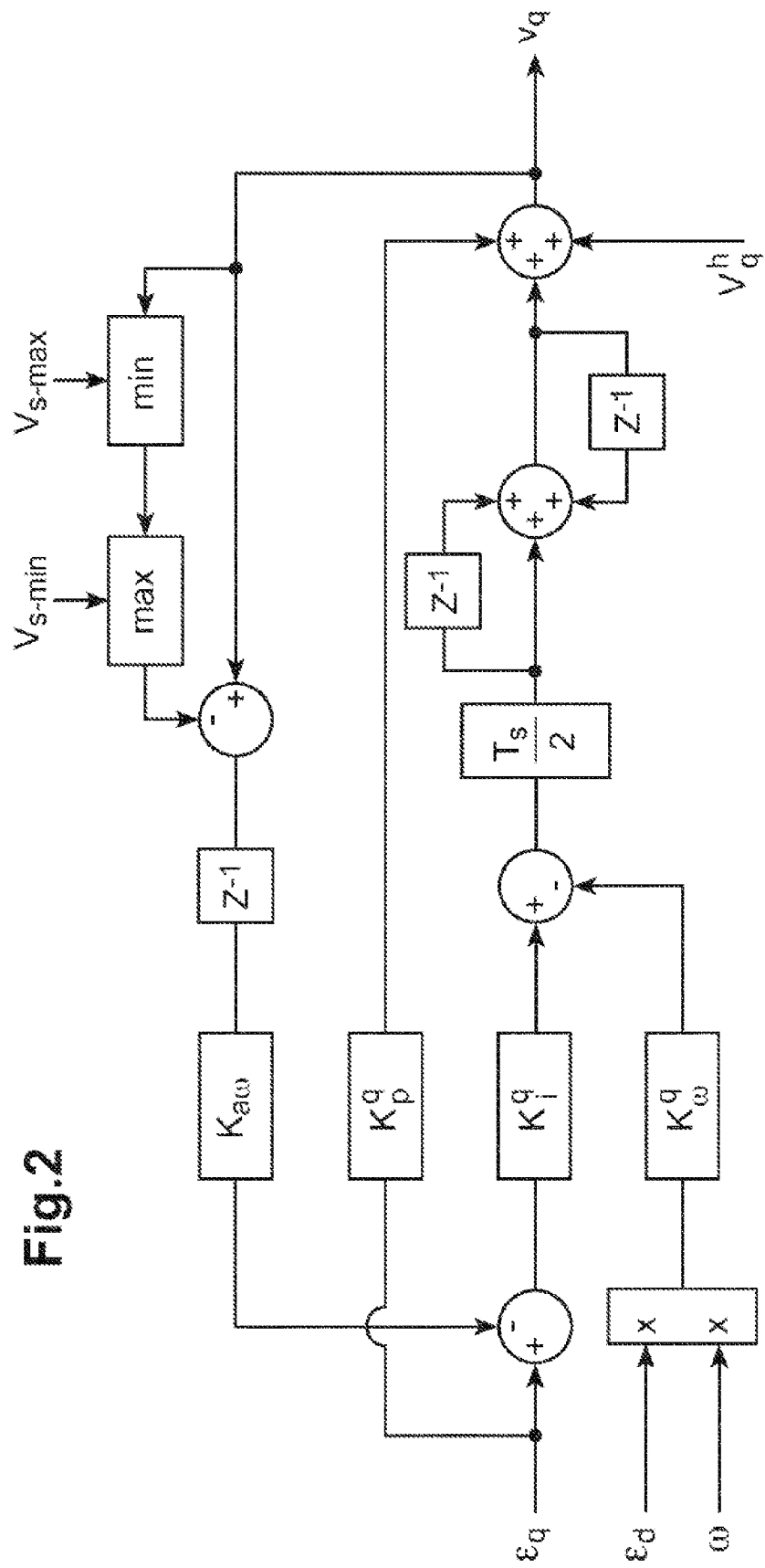
Figure 3:
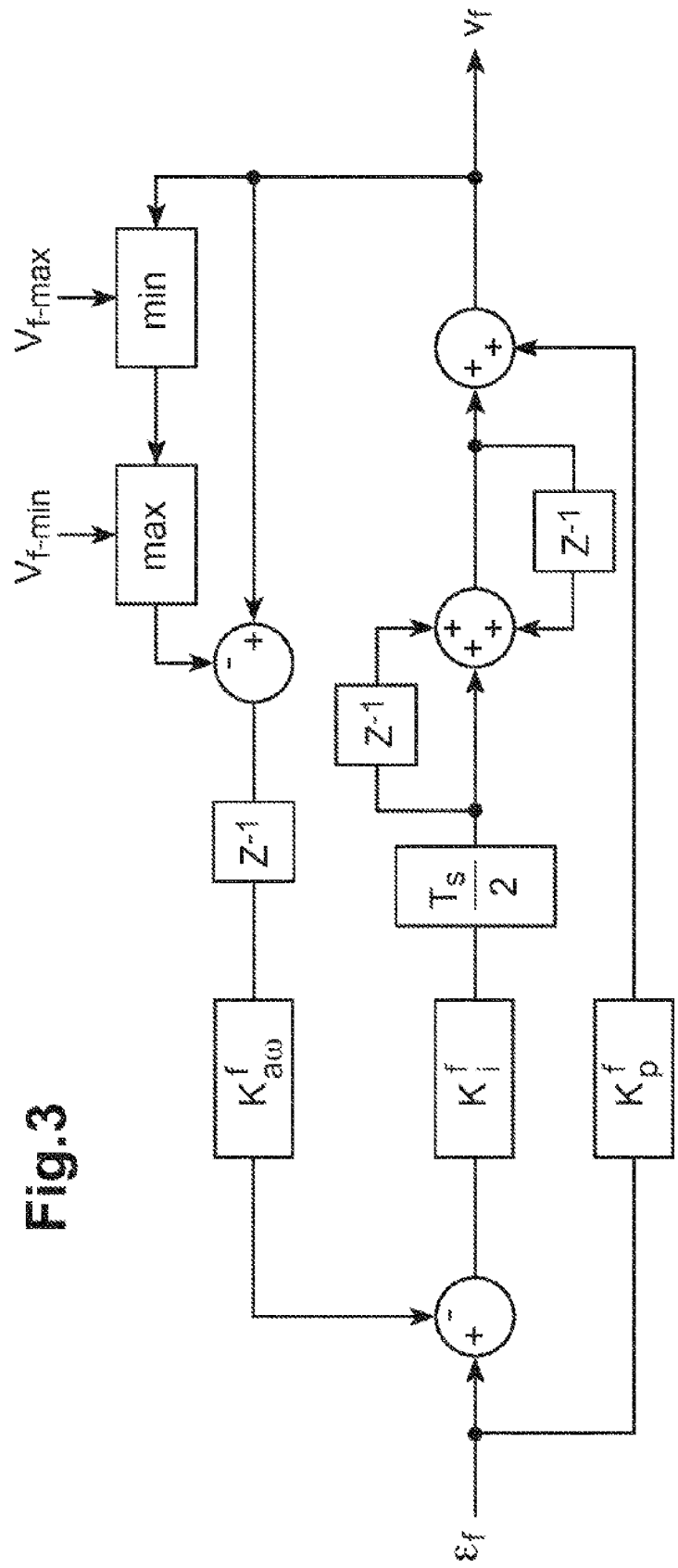
FIG. 3 shows a schematic representation of a supplementary step to those represented in FIGS. 1 and 2, for the first form of embodiment of the invention for controlling a synchronous electrical machine with a wound rotor.

The objective of the control method according to the invention, with reference to FIGS. 1 to 5, is to control the inverter 3 such that it generates control voltages for application to the stator and the rotor (for the rotor, where the electrical machine 2 is of the wound rotor type) of the electrical machine 2.

The control device is therefore suitable for the communication to the inverter of control voltages which are desired to be delivered to the electrical machine 2; in this case, the action of the inverter 3, by the commutation of its power switches, generates the requisite control voltages from the DC voltage $V_{DC}$ of the electrical battery.

The inverter 3 is controlled in an independent manner, so as to generate control voltages for the electrical machine from the DC voltage $V_{DC}$, as required by the control method according to the invention. Additionally, different techniques for controlling an inverter which are not the object of the invention, such as "pulse width modulation" techniques, also known by the English acronym "PWM", will be familiar to a person skilled in the art.

The control device 4, in this form of embodiment of the invention, is a microcontroller or microprocessor. Additionally, the control device 4 deploys the method according to a natural clock pulse frequency, and executes the steps of the method in a discrete and repetitive manner.

The control device 4 further comprises a live memory, which permits the memorization of the results of calculations and measurements for the method deployed at previous times k−1, k−2, etc., in order to permit the employment thereof at a later time k. In practice, as the method according to the invention is of a recursive nature, it is necessary to be able to access results for the deployment of the method at previous times.

The method for controlling the electrical machine deployed by the control device 4 comprises a first step 51 for measuring currents of the first and second phases of the stator.

In this case, the measuring 51 of phase currents is executed by measuring components, such as ammeters installed between the inverter 3 and the electrical machine 2, in series in the first two phases.

The method also deploys a step 52 for measuring the rotor position, which may be measured 52 by a resolver, an optical encoder, an inductive encoder, or any other means known to a person skilled in the art.

In the first form of embodiment of the invention, the electrical machine comprises a wound rotor, such that a further measurement 54 of the rotor current is executed, in a similar manner to the measurement of the first two phases of the stator.

Currents in the first two phases of the stator, which will be described more simply here as the stator currents, are then transformed in a reference frame associated with the rotor (d, q), also described as the rotor reference frame.

For the transformation of stator currents measured at a time k in a rotor reference frame, a Park transformation is deployed in this form of embodiment.

Thus, from the measurement 52 of the two stator currents $i_a$ and $i_b$, and the measurement of the rotor angle θ, the currents $i_d^{mes}$ and $i_q^{mes}$ are calculated 53 by the application of a Park transformation:

$$i_{d[k]}^{mes} = i_{a[k]}\left(\cos\theta_{[k]} + \frac{1}{\sqrt{3}}\sin\theta_{[k]}\right) + \frac{2}{\sqrt{3}}i_{b[k]}\sin\theta_{[k]} \quad (1)$$

$$i_{q[k]}^{mes} = i_{a[k]}\left(\frac{1}{\sqrt{3}}\cos\theta_{[k]} - \sin\theta_{[k]}\right) + \frac{2}{\sqrt{3}}i_{b[k]}\cos\theta_{[k]} \quad (2)$$

where $(i_{d[k]}^{mes}, i_{q[k]}^{mes})$ is the vector of the stator currents measured at time k in the Park reference frame (d, q) associated with the rotor;

$\theta_{[k]}$ is the electrical angle of the rotor at time k;

$i_{a[k]}$ and $i_{b[k]}$ are the stator currents measured at time k on the first two phases A and B.

The currents $i_{d[k]}^{mes}$ and $i_{q[k]}^{mes}$ are then filtered using a low-pass filter of the first order, having an appropriate bandwidth, in a conventional manner for a person skilled in the art, in order to obtain $i_{d[k]}^{ftr}$ and $i_{q[k]}^{ftr}$ respectively.

Thereafter, an automatic control error is calculated 55 at a time k, such that:

$$\varepsilon_{d[k]} = i_{d[k]}^{req} - i_{d[k]}^{ftr} \quad (3)$$

$$\varepsilon_{q[k]} = i_{q[k]}^{req} - i_{q[k]}^{ftr} \quad (4)$$

$$\varepsilon_{f[k]} = i_{f[k]}^{req} - i_{f[k]}^{mes} \quad (5)$$

where $\varepsilon_{d[k]}$, $\varepsilon_{q[k]}$ are the automatic control errors in the rotor reference frame (d, q) of the stator currents;

$\varepsilon_{f[k]}$ is the automatic control error in the rotor current (identified by f) which, by definition, will already be present in the rotor reference frame;

$i_{d[k]}^{req}$, $i_{q[k]}^{req}$ and $i_{f[k]}^{req}$ are the requisite currents for the generation of the torque of the electrical machine; and $i_{f[k]}^{mes}$ is the rotor current measured at time k.

Thereafter, a calculation 56 is executed for the two compensating voltages $\upsilon_{d[k]}^h$, $\upsilon_{q[k]}^h$ which will permit the compensation of current harmonics, in a recursive manner, with initialization at 0:

$$v_{d[k]}^h = v_{d[k-1]}^h + K_{pj}^d \varepsilon_{f[k]} + \frac{T_s}{2} K_{if}^d (\varepsilon_{f[k]} + \varepsilon_{f[k-1]}) \quad (6)$$

$$v_{q[k]}^h = v_{q[k-1]}^h + K_{pj}^q \varepsilon_{f[k]} + \frac{T_s}{2} K_{if}^q (\varepsilon_{f[k]} + \varepsilon_{f[k-1]}) \quad (7)$$

Thereafter, a calculation 57 for control voltages is executed in a recursive manner, with initialization at 0.

Values for control voltages are calculated by the following equations:

$$v_{d[k]} = v_{d[k-1]} + K_p^d \varepsilon_{d[k]} + K_{pf}^d \varepsilon_{f[k]} + \frac{T_s}{2}(V_{d[k]}^l + V_{d[k-1]}^l) + v_{d[k]}^h \quad (8)$$

$$v_{q[k]} = v_{q[k-1]} + K_p^q \varepsilon_{q[k]} + K_{pf}^q \varepsilon_{f[k]} + \frac{T_s}{2}(V_{q[k]}^l + V_{q[k-1]}^l) + v_{q[k]}^h \quad (9)$$

$$v_{f[k]} = \quad (10)$$
$$v_{f[k-1]} + K_p^f \varepsilon_{f[k]} + K_i^f \frac{T_s}{2}(\varepsilon_{f[k]} + \varepsilon_{f[k-1]} - K_{aw}(\delta v_{f[k-1]} + \delta v_{f[k-2]}))$$

-continued where $$V_{d[k]}^i = K_i^d(\varepsilon_{d[k]} - K_{aw}\delta v_{d[k-1]}) - \omega_{[k]}K_\omega^d \varepsilon_{q[k]} + K_{if}^d \varepsilon_{f[k]} \quad (11)$$

$$V_{q[k]}^i = K_i^q(\varepsilon_{q[k]} - K_{aw}\delta v_{q[k-1]}) - \omega_{[k]}K_\omega^q \varepsilon_{d[k]} + K_{if}^q \varepsilon_{f[k]} \quad (12)$$

$$\delta v_{d[k]} = v_{d[k]} - \max\left\{\min\left\{v_{d[k]}, \frac{V_{DC}}{\sqrt{3}}\right\}, -\frac{V_{DC}}{\sqrt{3}}\right\} \quad (13)$$

$$\delta v_{q[k]} = v_{q[k]} - \max\left\{\min\left\{v_{q[k]}, \frac{V_{DC}}{\sqrt{3}}\right\}, -\frac{V_{DC}}{\sqrt{3}}\right\} \quad (14)$$

$$\delta v_{f[k]} = v_{f[k]} - \max\{\min\{v_{f[k]}, V_{DC}\}, -V_{DC}\} \quad (15)$$

in which:

$T_S$ is the refresh interval for control;
$V_{DC}$ is the voltage of the electrical accumulator battery;
$\omega[k]$ is the electrical angular speed of the rotor in rad/s at time k; and
$K_p^d$, $K_p^q$, $K_p^f$, $K_i^d$, $K_i^q$, $K_i^f$, $K_\omega^d$, $K_\omega^q$, $K_{aw}$, $K_{aw}^f$, $K_{pf}^d$, $K_{pf}^q$, $K_{if}^d$, $K_{if}^q$ are parameterization constants for the control system, which a person skilled in the art will be capable of determining. The control voltages $v_d$, $v_q$ calculated in the rotor reference frame are naturally referred back within the three-phase system associated with the stator before being transmitted by way of setpoint instructions to the inverter and applied to the electrical machine.

According to a second form of embodiment of the invention, the electrical machine is a permanent magnet synchronous electrical machine (PMSM). Accordingly, there is no rotor current in this machine.

The invention as described with reference to the first form of embodiment can be applied to this machine, simply by the exclusion of the calculations relating to rotor currents, namely equations (5), (6), (7), (10) and (15).

The invention claimed is:

1. A method for controlling a synchronous three-phase electrical machine comprising a stator and a rotor, said method comprising:
measuring currents of the first and second phases of said stator;
measuring the angular position of the rotor;
measuring current of the rotor;
calculating said currents measured in a rotor reference frame;
calculating an automatic control error;
calculating control voltages for the electrical machine; and
applying said control voltages to said electrical machine;
wherein said calculation of control voltages is executed in said rotor reference frame, in a recursive manner and as a function of a period value for the updating of control, a value for the DC voltage and the electrical angular speed of the rotor, wherein said method is characterized in that it comprises a step for the recursive calculation of compensating voltages for current harmonics,
wherein the calculation of control voltages incorporates calculation of a voltage to be applied to the wound rotor.

2. The method as claimed in claim 1, characterized in that said measured currents are calculated in the rotor reference frame by means of a Park transformation.

3. The method as claimed in claim 1, characterized in that said step for the calculation of control voltages comprises initialization at 0 for the purposes of recursion.

4. A control device of a synchronous three-phase electrical machine comprising a stator and a rotor, said device comprising:
a component for measuring currents of the first and second phases of said stator;
a component for measuring an angular position of the rotor;
a component for measuring the rotor current;
means for calculating said currents measured in a rotor reference frame;
means for calculating an automatic control error;
means for calculating control voltages for the electrical machine; and
means for applying said control voltages to said electrical machine;
wherein said means for calculating control voltages are appropriate for the execution of said calculation in said rotor reference frame, in a recursive manner and as a function of a period value for the updating of control, a value for the DC voltage and the electrical angular speed of the rotor, wherein said device is characterized in that it further comprises means for the recursive calculation of compensating voltages for current harmonics.

5. An electrical system comprising a synchronous electrical machine, having a stator and a wound rotor or a permanent magnet rotor, an electrical accumulator battery for the supply of said electrical machine, a three-phase inverter which is capable of transforming the DC voltage of the electrical accumulator battery into three-phase control voltages for controlling the synchronous electrical machine, and a control device as claimed in claim 4.

6. A motor vehicle comprising an electrical system as claimed in claim 5.

* * * * *